(12) United States Patent
van Houtum (10) Patent No.: US 10,014,893 B2
(45) Date of Patent: Jul. 3, 2018

(54) RECEIVER CIRCUIT

(71) Applicant: NXP B.V.

(72) Inventor: Wim van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/649,986

(22) Filed: Jul. 14, 2017

(65) Prior Publication Data

US 2018/0083660 A1   Mar. 22, 2018

(30) Foreign Application Priority Data

Sep. 16, 2016 (EP) .................................... 16189337

(51) Int. Cl.
| H04B 7/04 | (2017.01) |
| H04B 1/10 | (2006.01) |
| H04L 27/14 | (2006.01) |
| H04B 17/20 | (2015.01) |

(52) U.S. Cl.
CPC ........... *H04B 1/1027* (2013.01); *H04B 17/20* (2015.01); *H04L 27/14* (2013.01)

(58) Field of Classification Search
CPC ........ H04B 1/1027; H04B 17/20; H04L 27/14
See application file for complete search history.

(56) References Cited

U.S. PATENT DOCUMENTS

| 6,128,355 A | 10/2000 | Backman et al. |
| 6,167,039 A * | 12/2000 | Karlsson ............. H04B 7/0854 370/320 |
| 6,259,893 B1 | 7/2001 | Kroeger et al. |
| 6,671,340 B1 | 12/2003 | Kroeger et al. |
| 2003/0053412 A1 | 3/2003 | Yoshida et al. |
| 2005/0135324 A1 | 6/2005 | Kim et al. |
| 2008/0056343 A1 | 3/2008 | Rajagopal et al. |

(Continued)

FOREIGN PATENT DOCUMENTS

EP   3197058 A1   7/2017

OTHER PUBLICATIONS iBIQiBiquity Digital Corporation, HD Radio™ Air Interface Design Description Layer 1 FM, Rev. G. 133 pgs. (Aug. 23, 2011).

(Continued)

*Primary Examiner* — Dac Ha
(74) *Attorney, Agent, or Firm* — Rajeev Madnawat (57) ABSTRACT

A receiver circuit comprising a beamformer and an MRC-block. The beamformer configured to: apply combination-weighting-values to a first-BF-input-signal and a second-BF-input-signal in order to provide a BF-combination-signal; and apply suppression-weighting-values to the first-BF-input-signal and the second-BF-input-signal in order to provide a BF-suppression-signal. The MRC-block comprising: a first-demodulator configured to demodulate the BF-combination-signal in order to provide a demodulated-combination-signal that comprises bit metrics; a second-demodulator configured to demodulate the BF-suppression-signal in order to provide a demodulated-suppression-signal that comprises bit metrics; and a combiner configured to combine the demodulated-combination-signal with the demodulated-suppression-signal in order to provide an MRC-output-signal.

15 Claims, 5 Drawing Sheets

(56) References Cited

U.S. PATENT DOCUMENTS

| | | | |
|---|---|---|---|
| 2012/0033751 A1 | 2/2012 | Sathananthan et al. | |
| 2012/0114031 A1 | 5/2012 | Li et al. | |
| 2012/0134435 A1* | 5/2012 | Kapoor | H01Q 1/246 |
| | | | 375/267 |
| 2013/0308717 A1* | 11/2013 | Maltsev | H04B 7/0417 |
| | | | 375/267 |
| 2014/0056378 A1* | 2/2014 | Harel | H04B 7/0408 |
| | | | 375/267 |
| 2014/0153625 A1 | 6/2014 | Vojcic et al. | |
| 2016/0134337 A1* | 5/2016 | Branlund | H04B 7/212 |
| | | | 455/446 |
| 2016/0142119 A1 | 5/2016 | van Houtum | |
| 2016/0204810 A1 | 7/2016 | Murrin | |
| 2017/0214499 A1* | 7/2017 | van Houtum | H04B 1/1027 |
| 2017/0331545 A1* | 11/2017 | van Houtum | G01S 3/06 |

OTHER PUBLICATIONS

National Radio Systems Committee, "NRSC-5-C In-band/on-channel Digital Radio Broadcasting Standard", 53 pgs. (Sep. 2011).

Proakis, J. et al. "Digital Communications, Chapter Thirteen: Fading Channels I: Characterization and Signaling". 5th edition, ISBN 978-0-07-295716-7, 5pgs. 851-855.

Final Office Action dated May 17, 2018 for U.S. Appl. No. 15/641,881 9 pages.

Non-Final Office Action dated Nov. 11, 2017 for U.S. Appl. No. 15/641,881 6 pages.

Non-Final Office Action dated Feb. 6, 2018 for U.S. Appl. No. 15/649,986 8 pages.

\* cited by examiner

RECEIVER CIRCUIT

CROSS-REFERENCE TO RELATED APPLICATIONS

This application claims the priority under 35 U.S.C. § 119 of European Patent application no. 16189337.5, filed on Sep. 16, 2016, the contents of which are incorporated by reference herein.

The present disclosure relates to receiver circuits, including receiver circuits that provide co-channel-interference-compensation (CIC).

According to a first aspect of the present disclosure there is provided a receiver circuit comprising:
  a beamformer configured to receive a first-BF-input-signal and a second-BF-input-signal, the beamformer comprising:
    a combination-weights-calculator configured to process the first-BF-input-signal and the second-BF-input-signal in order to determine combination-weighting-values;
    a suppression-weights-calculator configured to process the first-BF-input-signal and the second-BF-input-signal in order to determine suppression-weighting-values;
    a BFC-signal-generator configured to apply the combination-weighting-values to the first-BF-input-signal and the second-BF-input-signal in order to provide a BF-combination-signal; and
    a BFS-signal-generator configured to apply the suppression-weighting-values to the first-BF-input-signal and the second-BF-input-signal in order to provide a BF-suppression-signal; and
  an MRC-block comprising:
    a first-demodulator configured to demodulate the BF-combination-signal in order to provide a demodulated-combination-signal that comprises bit metrics;
    a second-demodulator configured to demodulate the BF-suppression-signal in order to provide a demodulated-suppression-signal that comprises bit metrics; and
    a combiner configured to combine the demodulated-combination-signal with the demodulated-suppression-signal in order to provide an MRC-output-signal.

In one or more embodiments the combination-weighting-values comprise values for application to the first-BF-input-signal and the second-BF-input-signal in order to constructively combine the first-BF-input-signal and the second-BF-input-signal.

In one or more embodiments the combination-weighting-values comprise one or more of:
  lower-combination-weighting-values that include values for application to a lower-frequency-bin of the first-BF-input-signal and the second-BF-input-signal in order to constructively combine the lower-frequency-bin of the first-BF-input-signal and the second-BF-input-signal;
  middle-combination-weighting-values that include values for application to a middle-frequency-bin of the first-BF-input-signal and the second-BF-input-signal in order to constructively combine the middle-frequency-bin of the first-BF-input-signal and the second-BF-input-signal; and
  upper-combination-weighting-values that include values for application to an upper-frequency-bin of the first-BF-input-signal and the second-BF-input-signal in order to constructively combine the upper-frequency-bin of the first-BF-input-signal and the second-BF-input-signal.

In one or more embodiments the suppression-weighting-values comprise first-values for application to the first-BF-input-signal and the second-BF-input-signal in order to destructively combine one or more frequency bins of the first-BF-input-signal and the second-BF-input-signal.

In one or more embodiments the suppression-weighting-values also comprise second-values for application to the first-BF-input-signal and the second-BF-input-signal in order to constructively combine one or more other frequency bins of the first-BF-input-signal and the second-BF-input-signal.

In one or more embodiments the suppression-weighting-values comprise one or both of:
  outer-suppression-weighting-values that include values for application to an outer-frequency-bin of the first-BF-input-signal and the second-BF-input-signal in order to destructively combine the outer-frequency-bin of the first-BF-input-signal and the second-BF-input-signal;
  middle-suppression-weighting-values that include values for application to a middle-frequency-bin of the first-BF-input-signal and the second-BF-input-signal in order to constructively combine the middle-frequency-bin of the first-BF-input-signal and the second-BF-input-signal.

In one or more embodiments the outer-suppression-weighting-values comprise:
  lower-suppression-weighting-values that include values for application to a lower-frequency-bin of the first-BF-input-signal and the second-BF-input-signal in order to destructively combine the lower-frequency-bin of the first-BF-input-signal and the second-BF-input-signal; and/or
  upper-suppression-weighting-values that include values for application to an upper-frequency-bin of the first-BF-input-signal and the second-BF-input-signal in order to destructively combine the upper-frequency-bin of the first-BF-input-signal and the second-BF-input-signal.

In one or more embodiments the combination-weights-calculator is configured to set the combination-weighting-values as the middle-suppression-weighting-values.

In one or more embodiments the suppression-weights-calculator is configured to determine the suppression-weighting-values by applying a maximization of SINR criterion algorithm.

In one or more embodiments the demodulated-combination-signal and the demodulated-suppression-signal comprise Viterbi bit metrics.

In one or more embodiments:
  the combination-weights-calculator is configured to process subsets of frequency bins associated with the first-BF-input-signal and the second-BF-input-signal in order to determine the combination-weighting-values; and/or
  the suppression-weights-calculator is configured to process subsets of frequency bins associated with the first-BF-input-signal and the second-BF-input-signal in order to determine the suppression-weighting-values.

In one or more embodiments:
  the BFC-signal-generator is configured to apply the combination-weighting-values to the entire frequency bins associated with the first-BF-input-signal and the second-BF-input-signal in order to provide the BF-combination-signal; and/or the BFS-signal-generator is configured to apply the suppression-weighting-values to the entire frequency bins associated with the first-BF-input-signal and the second-BF-input-signal in order to provide the BF-suppression-signal.

In one or more embodiments the first-BF-input-signal is received from a first antenna, and the second-BF-input-signal is received from a second antenna.

In one or more embodiments the MRC-output-signal is representative of a combination of the first-BF-input-signal and the second-BF-input-signal.

There may be provided a method of operating a receiver circuit, the method comprising,
receiving a first-BF-input-signal and a second-BF-input-signal;
processing the first-BF-input-signal and the second-BF-input-signal in order to determine combination-weighting-values;
processing the first-BF-input-signal and the second-BF-input-signal in order to determine suppression-weighting-values;
applying the combination-weighting-values to the first-BF-input-signal and the second-BF-input-signal in order to provide a BF-combination-signal;
applying the suppression-weighting-values to the first-BF-input-signal and the second-BF-input-signal in order to provide a BF-suppression-signal;
demodulating the BF-combination-signal in order to provide a demodulated-combination-signal that comprises bit metrics;
demodulating the BF-suppression-signal in order to provide a demodulated-suppression-signal that comprises bit metrics; and
combining the demodulated-combination-signal with the demodulated-suppression-signal in order to provide an MRC-output-signal.

There may be provided a car radio receiver system comprising any receiver circuit disclosed herein, or configured to perform any method disclosed herein.

There may be provided an integrated circuit or electronic device comprising any circuit or system disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

The in-band on-channel (IBOC) digital radio broadcasting standard for the FM-band is defined by the FM-part of the "In-band/on-channel Digital Radio Broadcasting Standard" document published by National Radio Systems Committee (NRSC). This document is also the basis for the transmitted IBOC-signals that can be received by an HD Radio™ certified receiver. The HD Radio™ transmissions are also based on "HD Radio™ Air Interface Design Description Layer 1 FM", Doc. No.: SY_IDD_1011sG Rev. G, Aug. 23, 2011.

Figure 1:
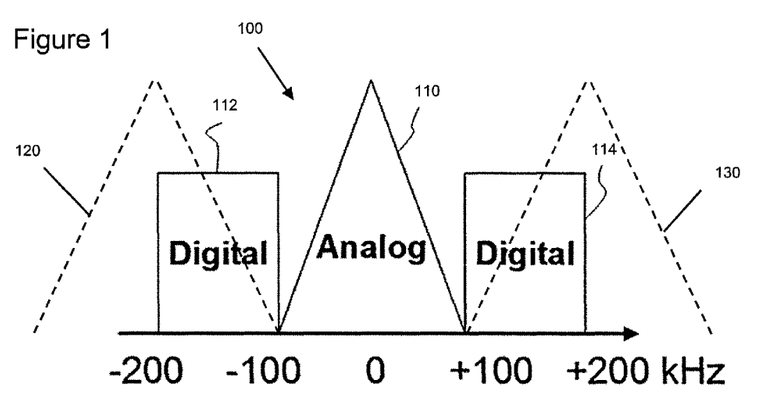
FIG. 1 shows a simplified form of one type of IBOC signal.

FIG. 1 shows a simplified form of one type of IBOC signal 100, which is the so-called "Hybrid IBOC FM" signal, and is denoted "Hybrid IBOC" in this document. Frequency is shown on the horizontal axis, with 0 Hz representing the carrier frequency. The vertical dimension of FIG. 1 represents power.

The hybrid signal 100 is a combination/addition of an analogue FM-signal 110 and a digitally-modulated signal 112, 114. The analogue FM-signal 110 occupies a bandwidth of 200 kHz, which is between −100 kHz and 100 kHz, and represents a central-part that is centred on the carrier frequency. The digitally-modulated signal 112, 114 occupies a bandwidth of roughly 200 kHz. However, the digitally-modulated signal is separated into a lower-sideband 112 and an upper-sideband 114, each with a bandwidth of roughly 100 kHz. The lower-sideband is spectrally positioned at a distance of 100 kHz below the carrier-frequency. The upper-sideband 114 is spectrally positioned at a distance of 100 kHz above the carrier-frequency. In this way, the lower-sideband 112 is below the lowest frequency of the central-part, and the upper-sideband 114 is above the highest frequency of the central-part. The digitally-modulated signal 112, 114 can use orthogonal frequency division multiplexing (OFDM), where the number of subcarriers can vary depending on the selected service/transmission-mode.

A so-called "channel-grid" defines a reserved channel-bandwidth for an analogue FM-signal. The channel bandwidth in Band-II is 200 kHz by regulation, as shown by the analogue central part 110 in FIG. 1. As a consequence, the lower and upper digital OFDM-sidebands 112, 114 can correspond to the frequency range of 1st adjacent lower and upper neighbouring FM-channels.

FIG. 1 also shows a 1st adjacent lower neighbouring FM-channel 120, and a 1st adjacent upper neighbouring FM-channel 130. The primary sidebands 112, 114 of the (H)IBOC signal occupy roughly 100 kHz of the lower neighbouring channel 120 and roughly 100 kHz of the upper neighbouring channel 130. Due to the fact that the primary sidebands 112, 114 are outside this 200 kHz grid, they are susceptible to interference by the neighbouring channels, that is 1st adjacent (FM)-interference. Thus, each 1st adjacent (FM)-signal 120, 130 of a (H)IBOC-transmission can introduce co-channel interference for the digitally modulated lower- and upper-sidebands 112, 114.

The co-channel interference, by regulation, can be up to a factor of a hundred stronger in power than the digitally-modulated lower- and upper-sidebands 112, 114. Moreover, both of the 1st-adjacent interference signals 120, 130 can be present at the same time, thus the lower- and upper-sidebands 112, 114 are in this case both distorted by a neighbouring FM-transmission. The hybrid IBOC signal 100 can therefore be considered as a noisy FM-signal.

Figure 2:
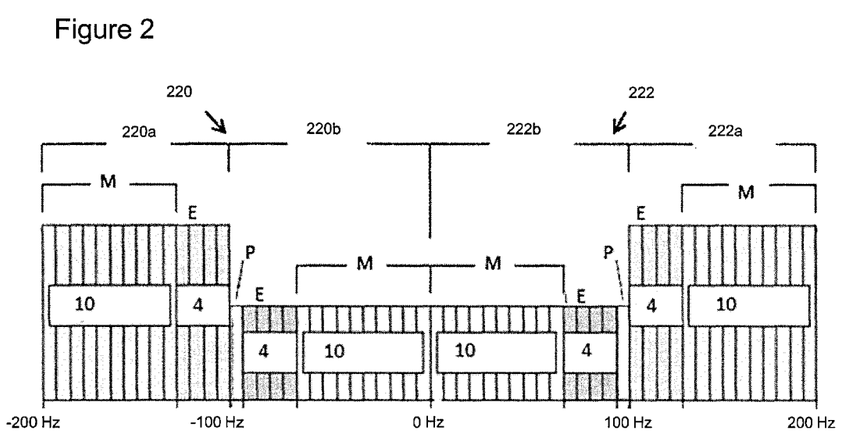
FIG. 2 shows a spectrum plot of an all-digital implementation of an IBOC signal.

FIG. 2 shows a spectrum plot of an all-digital implementation of an IBOC signal. For the all-digital IBOC FM signal, the analogue FM-signal is replaced by a (secondary) digitally-modulated signal 220b, 222b. In the all-digital mode, the bandwidth of the primary digital sidebands 220a, 222a is fully expanded with lower-power secondary sidebands.

The all-digital IBOC signal has a bandwidth of roughly 400 kHz. Approximately 100 kHz of each of the lower and upper adjacent channels is occupied (that is, the frequencies that are outside the 200 kHz "channel-grid"). The lower digital sideband of the all-digital IBOC signal is shown as 220 and the upper digital sideband is shown as 222. Each has a primary section 220a, 222a and a secondary section 220b, 222b. In FIG. 2, the number of extended frequency partitions (E) is fixed to 4. In a hybrid-mode system, for example as shown in FIG. 1, the number of extended frequency partitions (E) can be; 0, 1, 2, or 4, depending on the transmitted service mode.

Figure 3A:
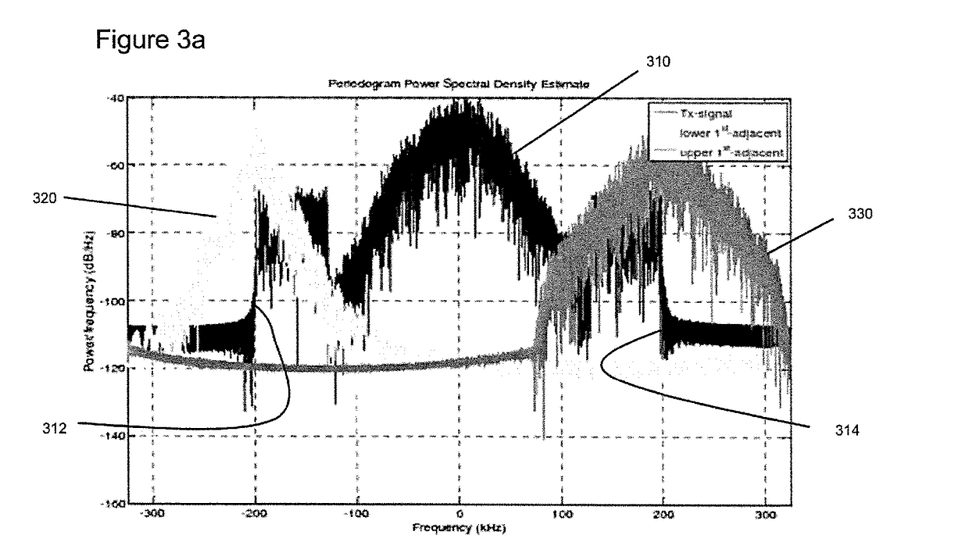
FIGS. 3a and 3b show a periodogram power spectral density (PSD) estimate of a (H)IBOC-transmission with lower and upper 1st-adjacent (FM)-interference signals.

FIG. 3a shows a periodogram power spectral density (PSD) estimate of a (H)IBOC-transmission with lower and upper 1st-adjacent (FM)-interference signals. Various portions of the signals in FIG. 3a have been given the same reference numbers as the corresponding portions of the signals shown in FIG. 1.

FIG. 3a shows that indeed the lower- and upper-sidebands 312, 314 of the (H)IBOC transmission (black-curve) are heavily distorted by the lower 1st-adjacent neighbour FM-transmission 320 (light-grey curve) and the upper 1st-adjacent neighbour FM-transmission (dark-grey curve) 330, respectively.

"In-band on-channel" (IBOC) radio transmission systems can be used to transmit digital radio and analogue radio broadcast signals simultaneously on the same frequency. As will be discussed below, there is also an all-digital version in which two digital signals are combined. The term (H)IBOC is used in this document to refer to an IBOC signal which can be in hybrid or all-digital form.

The signal of FIG. 3a can be considered as having three non-overlapping frequency bins: a lower-frequency-bin between −300 and −100 kHz; a middle-frequency-bin between −100 and +100 kHz, and an upper-frequency-bin between +100 and +300 kHz. The lower-frequency-bin and the upper-frequency-bin are examples of outer-frequency-bins and can also be referred to as first- and third-frequency-bins, which can include some interference (for example from an adjacent neighbouring FM-channel 320, 330) and a portion of a desired digital sideband signal 312, 314. The middle-frequency-bin can also be referred to as a second-frequency-bin, which can include a desired FM signal 310 (or a digital equivalent signal, as discussed above).

Figure 3B:
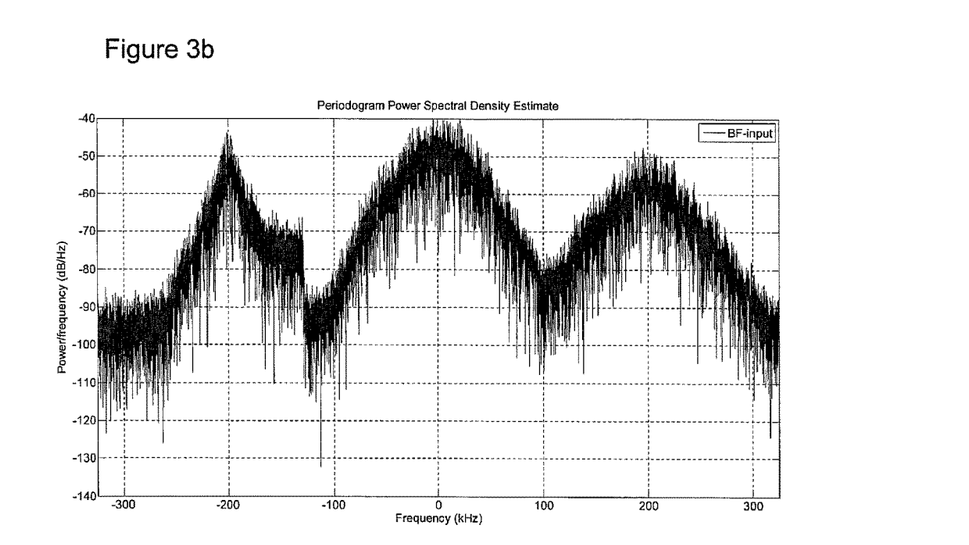

FIG. 3b shows an example input-signal for a receiver circuit that is disclosed herein, more particularly, for a beamformer as will be described below. The input signal is the summation of the (H)IBOC-transmission and the two 1st-adjacent FM-transmissions of FIG. 3a.

The received-signal includes the desired (H)IBOC-signal, which occupies roughly 400 kHz between −200 kHz and +200 kHz (shown by the black curve of FIG. 3a). Note that the received-signal, i.e., the input-signal of the beamformer, can include zero, one or two 1st adjacent (FM)-interference signals.

Figure 4:
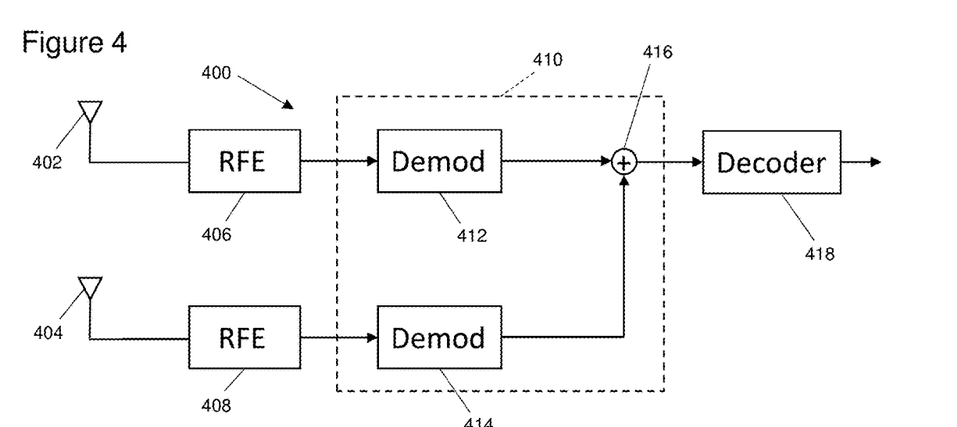
FIG. 4 shows a receiver circuit that applies the well-known Maximal Ratio Combining (MRC)

FIG. 4 shows a receiver circuit 400 that applies the well-known Maximal Ratio Combining (MRC), in order to improve reception of IBOC signals within a multiple-antennas scenario. The receiver circuit 400 includes a first-antenna 402 and a second-antenna 404.

A first-radio-front-end (RFE) 406 processes a first-antenna-signal from the first-antenna 402 and provides an output signal to a first-demodulator 412. In this example, the first-demodulator 412 computes and provides first-(Viterbi)-bit-metrics as an output signal. These first-(Viterbi)-bit-metrics are the "quality-indicators of the bits received by the first-antenna 402 for the (e.g. Viterbi) decoder block 418". Similarly, a second-radio-front-end (RFE) 408 processes a second-antenna-signal from the second-antenna 404 and provides an output signal to a second-demodulator 414. In this example, the second-demodulator 414 computes and provides second-(Viterbi)-bit-metrics as an output signal. These second-(Viterbi)-bit-metrics are also "quality-indicators of the bits received by the second-antenna 404 for the (e.g. Viterbi) decoder block 418".

The receiver circuit 400 also includes a combiner 416 that adds together the first-(Viterbi)-bit-metrics and the second-(Viterbi)-bit-metrics, and provides an MRC-output-signal. By adding together the (Viterbi)-bit-metrics in this way, they are maximum ratio combined such that the received-power of each antenna 402, 404 is controlled in such a way that it is constructively (coherently) added. That is, the signals from the two antennae 402, 404 are "weighted-added" such that the better the quality of the received signal given by the (Viterbi) bit-metric, the more contribution in the sum of the addition; and the lower the quality given by the (Viterbi) bit-metric, the less contribution in the sum of the addition.

However, due to the fact that MRC is, by definition, only capable of combining the power that is collected by each antenna it: i) has limited performance due to the fact that a receiving-antenna receives stronger electromagnetic waves in some directions than in others, i.e., it is a non-ideal omni-directional antenna, ii) cannot control suppression of undesired-signals, and iii) is costly since each antenna requires a complete detection path before signal combinations can take place.

The first-demodulator 412, second-demodulator 414 and the combiner 416 can together be referred to as an MRC-block 410.

Figure 5:
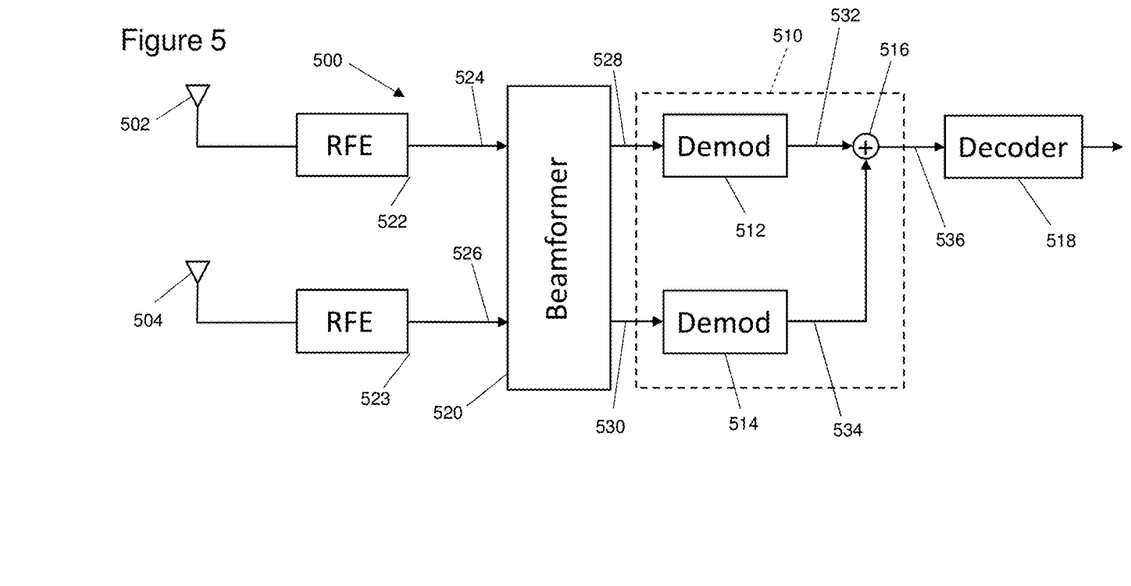
FIG. 5 shows an example embodiment of a receiver circuit that includes a modified beamformer.

FIG. 5 shows an example embodiment of a receiver circuit 500. The receiver circuit 500 includes a modified beamformer 520. The beamformer 520 receive a first-BF-input-signal 524 from a first-antenna 502, and also receives a second-BF-input-signal 526 from a second-antenna 504. As will be discussed in detail below, the beamformer provides a BF-combination-signal 528 and a BF-suppression-signal 530 as output signals.

In this example, the first-BF-input-signal 524 is received from the first-antenna 502. Also, the second-BF-input-signal 526 is received directly from the second-antenna 504.

The BF-combination-signal 528 and the BF-suppression-signal 530 are provided as inputs to an MRC-block 510. More specifically, the MRC-block 510 includes a first-demodulator 512 (which may be a digital-demodulator), a second-demodulator 514 (which may be a digital-demodulator) and a combiner 516.

The first-demodulator 512 in this embodiment demodulates the BF-combination-signal 528 in order to provide a demodulated-combination-signal 532. The second-demodulator 514 demodulates the BF-suppression-signal 530 in order to provide a demodulated-suppression-signal 534. The combiner 516 combines the demodulated-combination-signal 532 with the demodulated-suppression-signal 534 in order to provide an MRC-output-signal 536.

In this example the demodulated-signals 532, 534 comprise bit metrics such as Viterbi bit metrics. Therefore, maximum ratio combination (MRC) occurs when they are combined by the combiner 516.

The MRC-output-signal provided by the combiner 516 can then be processed by a decoder 418, which can also perform any further demodulation or other processing that is required.

It may not be possible to use conventional beamformers in the same way as the beamformer 520 of FIG. 5. This is because conventional beamformers do not have a plurality of output signals, which are required in order to perform MRC. Indeed, using a beamformer to provide multiple output signals is entirely inconsistent and incompatible with how beamformers are usually used.

Reception improvement of transmitted (H)IBOC-signals can be obtained with electronically steered antennae radiation-patterns of multiple(two)-antennae, e.g., an Uniform-Linear-Array (ULA) consisting of two isotropic antennae. To steer the radiation-pattern by using complex base-band signals with phase and amplitude-estimations can be referred to as; electronically-steered complex base-band beamforming. This type of beamforming also enables "null-steering" to suppress interference signals by using suppression-weighting-values. In this way it can enable the suppression of $1^{st}$-adjacent (FM)-interference signals for a (H)IBOC-transmission (in the hybrid-mode as well as in the all-digital mode). Moreover, this type of beamforming enables the so called; co-channel-interference cancellation (CIC) since the $1^{st}$ adjacent (FM)-interference signals are co-channel interference signals for the digitally-modulated side-bands of a (H)IBOC-transmission. On the other hand, as will be discussed in detail below, a (electronically-steered) beamforming approach that uses suppression-weighting-values includes second-suppression-weighting-values that perform constructive (coherent combination) addition of the received desired-signal (in the second-frequency-bin), just like MRC.

Note that, if there is a lack-of-spatial information (that is, a desired signal and an interference signal are received at an antenna from directions that are too similar, then using the suppression-weighting-values for each of an upper-, middle- and lower-frequency bin can be sensitive to undesirable: (i) "self-nulling" where a desired-signal is suppressed, and/or (ii) unnecessary suppression whereby the suppression-weighting-values are over-ruled but for no benefit.

One or more of the embodiments described herein utilise beamforming that can perform combining and suppression using suppression-weighting-values, in order to apply the suppression or the combining in the most efficient manner in terms of Signal-to-Interference+Noise Ratio (SINR) to an MRC-process, this is what we call; "Beamforming for MRC (BF4MRC)" and is provided by FIG. 5.

Figure 6:
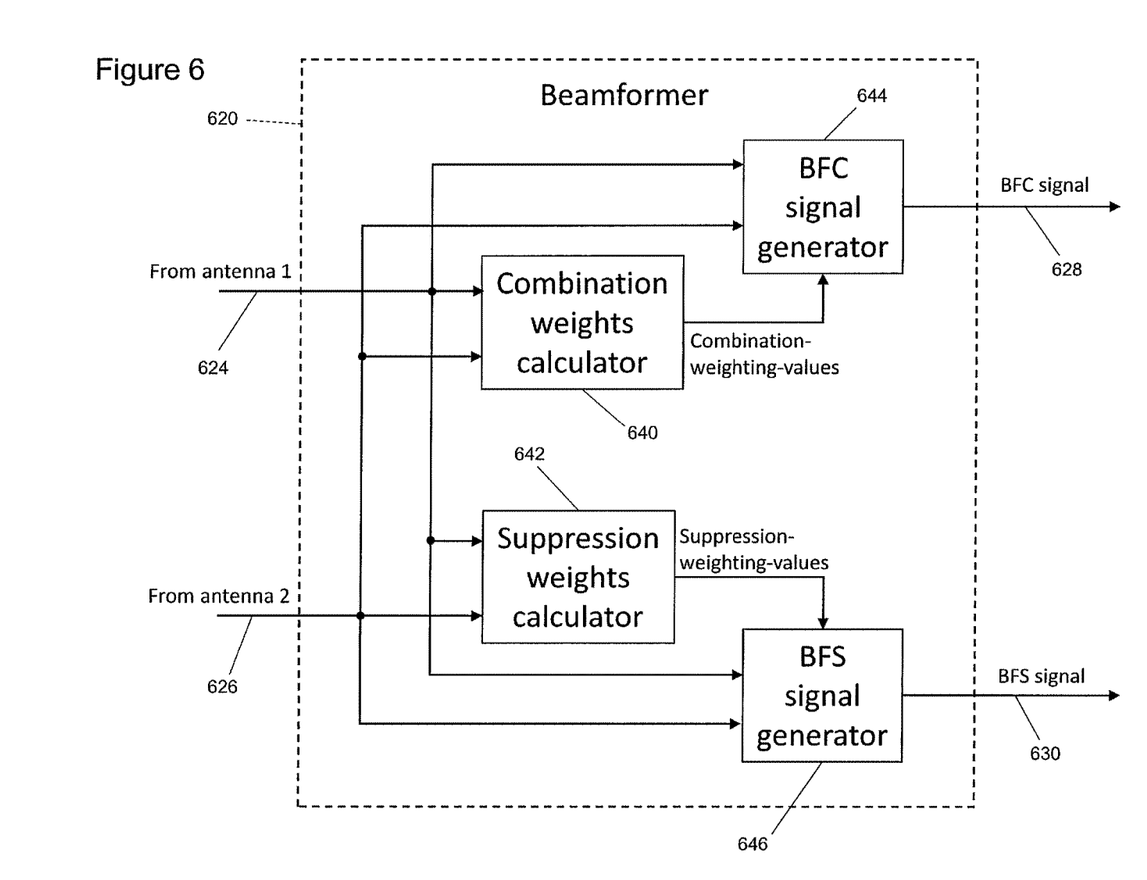
FIG. 6 shows an example embodiment of a (modified) beamformer that can be used in the receiver circuit of FIG. 5.

FIG. 6 shows an example embodiment of a (modified) beamformer 620 that can be used in the receiver circuit of FIG. 5. The beamformer 620 receives a first-BF-input-signal 624 and a second-BF-input-signal 626. The beamformer 620 includes a combination-weights-calculator 640, a suppression-weights-calculator 642, a BFC-signal-generator 644 and a BFS-signal-generator 646.

The combination-weights-calculator 640 processes the first-BF-input-signal 624 and the second-BF-input-signal 626 in order to determine combination-weighting-values. As will be discussed in detail below with reference to FIG. 7, the combination-weighting-values comprise values for application to the first-BF-input-signal 624 and the second-BF-input-signal 626 in order to constructively combine these signals 624, 626.

The suppression-weights-calculator 642 processes the first-BF-input-signal 624 and the second-BF-input-signal 626 in order to determine suppression-weighting-values. As will be discussed in detail below with reference to FIG. 7, the suppression-weighting-values can comprise first-values and second-values for application to the first-BF-input-signal 624 and the second-BF-input-signal 626. The first-values can be set in order to destructively combine one or more frequency bins of the first-BF-input-signal 624 and the second-BF-input-signal 626. The second-values can be set in order to constructively combine one or more other frequency bins of the first-BF-input-signal and the second-BF-input-signal. For example, an outer-frequency-bin of the first-BF-input-signal and the second-BF-input-signal may be destructively combined, on the basis that the outer-frequency-bin may contain interference. A middle-frequency-bin of the first-BF-input-signal and the second-BF-input-signal may be constructively combined, on the basis that the middle-frequency-bin should contain a desired signal without significant interference, for example because it corresponds to a reserved frequency range in a channel-grid.

The BFC-signal-generator 644 applies the combination-weighting-values to the first-BF-input-signal 624 and the second-BF-input-signal 626 in order to provide the BF-combination-signal 628. The BFS-signal-generator 646 applies the suppression-weighting-values to the first-BF-input-signal 624 and the second-BF-input-signal 626 in order to provide the BF-suppression-signal 630.

In some examples, the combination-weights-calculator 640 and the suppression-weights-calculator 642 can share common functionality processing. Also, the BFC-signal-generator 644 and the BFS-signal-generator 646 can share common functionality processing.

Figure 7:
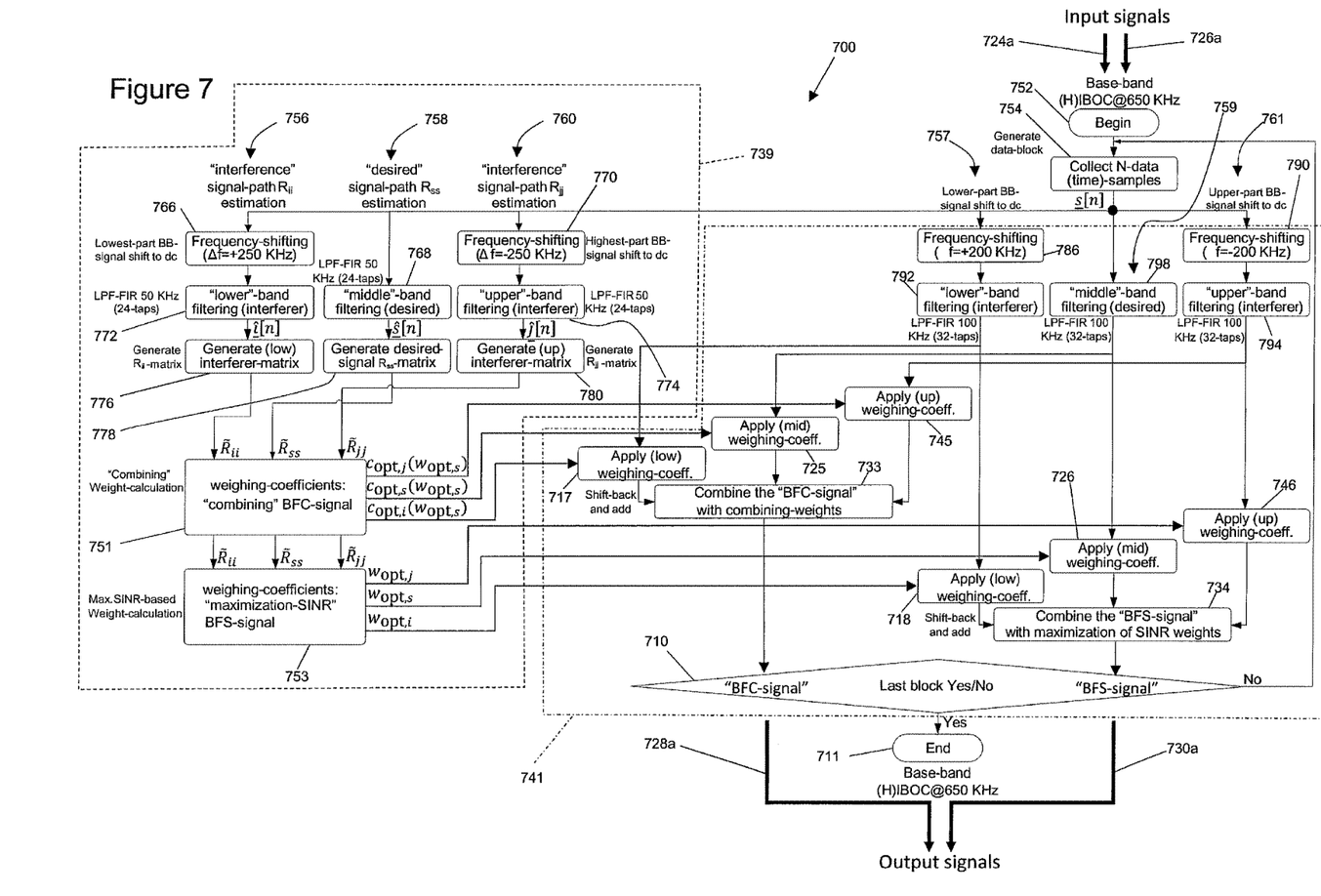
FIG. 7 shows a detailed view of a method that can be performed by a (modified) beamformer such as the one of FIG. 6.

FIG. 7 shows a detailed view of a method 700 that can be performed by a beamformer such as the one of FIG. 6.

A beamforming process has the objective to remove, or at least reduce, both the $1^{st}$-adjacent interference signals with the usage of multiple antennae, preferably only two antennae for reasons of low complexity and costs. It is recalled that MRC (in itself) may not be capable of removing or reducing the co-channel interference caused by the $1^{st}$-adjacent (FM)-interference signals because MRC is only optimally combining the total signal-energy, i.e., including the $1^{st}$-adjacent signal-energy. If the desired (H)IBOC-signal and both $1^{st}$-adjacent (FM)-interference signals are originating from different locations, which is normally the case by FM-transmissions in Band-II, embodiments disclosed herein utilise a beamforming approach that applies suppression-weighting-values in order to exploit the space-domain to try and remove the $1^{st}$-adjacent (FM)-interference signals. It is a task of the (electronically-steered complex base-band) beamforming algorithm to separate the three different signals by their spatially different information ("spatial-signature").

In order to assist the understanding of the method of FIG. 7, the first-BF-input-signal 724a and the second-BF-input-signal 726a are shown near the start of the method 700, and the BF-combination-signal 728a and the BF-suppression-signal 730a are shown near the end of the method.

The method of FIG. 7 begins at step 752 where a time-discrete base band signal, for example, with a sample frequency of 650 kHz, may be selected and down-converted for each of a plurality of antenna-signals such that all of the information from a frequency domain/time domain of −325 kHz to +325 kHz for each signal may be captured. At step 754 a number N of data samples may be collected. Note that although the signals shown in FIGS. 1 to 3 are illustrative of a sample frequency, the N-data samples in FIG. 7 are time samples, rather than frequency samples. N may be a number that is sufficiently high such that the training signals are effectively representative of the interference and desired signals.

For example, roughly 2000 samples (in one example 1872 samples) may be used to make a training signal for a frequency of 650 kHz. A person of skill in the art will understand that the length of each sample will depend on the sample frequency—for instance, in the case of 650 KHz, 1.65 micro-seconds (μs), such that 2000 samples for 650 kHz may result in, at the most, latency on the order of 3 milliseconds (ms). Note that analogue-to-digital conversion of the received signals can be performed as part of the IBOC-rendering process; thus, no additional processing other than for writing the samples may be required to render samples. This is because the samples are merely the digital representation of the received signal repeatedly processed (divided) into N time-samples. Thus, the sampling may be constant, so that new samples are continually available. Thus, step 754 may repeat many times before moving on, as discussed below. As such, the most recent N-data samples may be maintained, such that older samples may be discarded as new samples are obtained. In some embodiments, rather than constantly being updated, samples may be updated with a frequency dependent on the speed of movement of the antenna array or the interference level of the desired signal.

Further, in part due to the added complexity and processing power required, a new range for the beamformer may not be calculated for every updated sample that is collected—thus, the samples may be collected more frequently than the range is updated so that the samples are available as needed when it is determined that it is time that a new range be calculated. As noted above, if no samples have been collected when a range is to be calculated (e.g. when first tuning to the frequency), the latency will be on the order of the time required to collect N samples, which may be expressed as, if recalculating at time t, the samples will be taken from t-(N*length$_{sample}$), and the beamformer will not continue until N samples have been collected.

Also, in one embodiment the intervals between recalculation of the beamformer may depend on factors such as the speed of the receiver (e.g. assuming the receiver is located on a motorized vehicle)—in theory, if the receiver is moving quickly, in an extreme case the beamformer may be re-calculated for every N+1 samples (e.g. the first calculation might be run on 0-2000 samples, the second calculation might be run on 1-2001 samples). Thus, the update rate would be the same as the sample rate, but such a scenario would require significant processing capability.

The method includes a first-estimation-path 756, a second-estimation-path 758 and a third-estimation-path 760, for determining two sets of weighting values for each of the first-frequency-bin, second-frequency-bin and third-frequency-bin. (The first-frequency-bin may also be referred to as a lower-frequency-bin, the second-frequency-bin as a middle-frequency-bin, and the third-frequency-bin as an upper-frequency-bin.) These three estimation paths, and the associated steps for calculating the weights, are shown in a dashed box 739 in FIG. 7, which generally corresponds to the functionality of the combination-weights-calculator and the suppression-weights-calculator of FIG. 6.

The method of FIG. 7 also includes three frequency-splitting-paths: a first-frequency-splitting-path 757, a second-frequency-splitting-path 759 and a third-frequency-splitting-path 761. Each of these three frequency-splitting-paths then branches into: (i) a BFC-signal-generating-path (steps 717, 725, 745, 733); and (ii) a BFS-signal-generating-path (steps 718, 726, 746, 734), as will be discussed in more detail below. The BFC-signal-generating-path and the BFS-signal-generating-path generate the BF-combination-signal 728a and the BF-suppression-signal 730a by applying one of the sets of weighting values that are determined by the estimation-paths 756, 758, 760.

These three frequency-splitting-paths 757, 759, 761, and the associated steps for generating the BF-combination-signal 728a and the BF-suppression-signal 730a, are shown in a dot-dashed box 741 in FIG. 7, which generally corresponds to the functionality of the BFC-signal-generator and the BFS-signal-generator of FIG. 6.

As will be described below, in this example the estimation-paths 756, 758, 760 process subsets of the associated frequency-bins, whereas the BFC-signal-generating-path and the BFS-signal-generating-path combine the entire frequency-bins.

As illustrated by the first-estimation-path 756, a representative of the lower 1st adjacent interference signal, calculated from the N samples, may be obtained in the frequency-bin around −250 kHz, between −200 kHz and −300 kHz 766 for each antenna-signal. In this frequency bin there may be little interference, for example, from the lower digital sideband of the desired IBOC signal. That is, the first-estimation-path 756 may relate to processing on an outer-subset (between −200 kHz and −300 kHz) of the first-frequency-bin (between −100 kHz and −300 kHz).

In the second-estimation-path 758, a representative of the desired-signal, calculated from the N samples, may be obtained in the frequency-bin around zero Hertz (0 kHz) between −50 kHz and +50 kHz 768 for each antenna-signal. In this frequency bin there may be relatively little interference, for example, from the lower first adjacent interference signal and the upper first adjacent interference signal. That is, the second-estimation-path 758 may relate to processing on a middle-subset (between −50 kHz and +50 kHz) of the second-frequency-bin (between −100 kHz and +100 kHz).

In the third-estimation-path 760, a representative of the upper 1st adjacent interference signal, calculated from the N samples, may be obtained in the frequency-bin around +250 kHz, between +200 kHz and +300 kHz 770, where there may be little interference, for example, from the upper digital sideband of the desired IBOC signal. That is, the third-estimation-path 760 may relate to processing on an outer-subset (between +200 kHz and +300 kHz) of a third-frequency-bin (between +100 kHz and +300 kHz).

Thus, the representative of the lower 1st adjacent interference signal, and the representative of the upper 1st adjacent interference signal, may be centered at steps 766 and 770 such that the signal is shifted to the Direct Current (DC) bias. Note that, for the second-estimation-path 758, the antenna-signals do not need to be shifted to the DC bias because the second-frequency-bin is already centred on 0 Hz. Thus, second-estimation-path 758 may proceed to step 768 from step 754, or in an alternate embodiment step 768 may wait for steps 772 and 774 to run in parallel.

At steps 772, 768 and 774, each of the representatives of the frequency-shifted lower 1st adjacent interference signal, desired signal, and frequency-shifted upper 1st adjacent interference signal may be filtered using a low-pass filter (LPF) of 50 kHz around 0 Hz (e.g. from −50 kHz to 50 kHz) with a finite impulse response (FIR) of 24-taps. In one embodiment, a low-pass filter is combined with a band-pass filter to shift each signal to zero (steps 766 and 770), and to filter out half of the signal to ensure the cleanest signal possible (steps 772, 768, and 774). Thus, these three different frequency bands of 100 kHz (which are subsets of the first-, second- and third-frequency-bins) may be referred to as training signals or surrogate signals.

Weighting Values Computation

The computation of the combination-weighting-values and the suppression-weighting-values will be introduced in this section, and begins with the following sub-steps in FIG. 7:

generating a first-frequency-bin-matrix 776,
generating a second-frequency-bin-matrix 778, and
generating a third-frequency-bin-matrix 780.

Computation of the weighting-values is based on the (sample-based) spatial-covariance matrices as described below. As will be discussed below, the suppression-weighting-values are generated based on the spatial covariance matrices by applying a "maximization of SINR criterion" algorithm, and these suppression-weighting-values are applied to the $1^{st}$, $2^{nd}$ and $3^{rd}$-frequency-bins to generate the BFS-signal 730a. The combination-weighting-values can be considered as "overruling" the suppression-weighting-values of the $1^{st}$ and $3^{rd}$ frequency bins.

Moreover, as discussed above, each of the (sample-based) spatial-covariance matrices are obtained by using a portion of roughly 100 kHz wide (frequency-bin of 100 kHz) to obtain training-signals or surrogate-signals (representatives) for the desired-(H)IBOC-signal, the lower 1st adjacent (FM)-interference-signal, and the upper 1st adjacent (FM)-interference-signal. In the remainder of this section we will introduce and explain in detail the computation of the weighting-values.

In one example, helpful information for obtaining the BFC-signal 728a might be obtained by computing steering-vector information with the help of the MMSE-criterion as we will describe here below. In other examples, different types of computation can be used for obtaining the BFC-signal 728a, for instance, all three of the BFC-weights (pairs) could also be just a copy of the weight (pair) of the 2nd-frequency-bin computed by the maximization-SNR for the BFS-signal. The MRC-block can then "make" the (optimal) decision between "overruling-or-not" by its inherently "weighted-addition" by means of summing of the bit-metrics.

In this example, the surrogates of the received lower 1st-adjacent (FM)-interference-signal, the received desired-signal, and the received upper 1st-adjacent (FM)-interference signal are processed by the so called; "Prevention of self-nulling" algorithm. This prevention of self-nulling algorithm calculates complex-numbers that represent estimates of the steering-vectors of the received lower and upper 1st-adjacent interference-signals as well as of the received desired-signal. Therefore, the steering-vector contains the necessary spatial-information to provide the BFS-signal 730a and the BFC-signal 728a such that they have relevance to the spatial-domain in which the antenna signals were received. As we will show, the computation of the steering-vectors can be very quick by solving an Eigen-value problem with the help of the "principal-component-analysis" (pca)-method, the so called; "estimation-and-plug" techniques. In our case, the statistical pca-method uses as an orthogonal transformation the solutions of an Eigen-value problem. By solving this Eigen-value problem, a set of observations of possibly correlated variables, i.e., the observations for our spatial-covariance matrix, are transformed into a set of values of linearly uncorrelated (orthogonal) variables called the principal components. In our case these principal components are the Eigen-vectors of the spatial-covariance matrix, i.e., a Singular-Value-Decomposition (SVD) of the spatial-covariance matrix. Moreover, with the pca-method the Eigen-vector with the largest Eigen-value is the first principal-component. We will show later on that this principal-component is proportional to the required steering-vector. In addition, the specific version of the pca-method, i.e., the SVD of a (2-by-2) spatial-covariance matrix, that is used in this example can be applied very quickly (which may be considered as instantaneous). Consequently, the associated processing is fast, i.e., it has a low-latency. Actually, the latency is only determined by the observations (samples) required to compute the spatial-covariance matrix.

The computation-criterion for the steering-vector is the minimization of the mean-square-error (MMSE), i.e., the known Wiener-Hopf criterion. The solution of the Wiener-Hopf criterion can provide the steering-vector under some assumptions, which we will introduce later on in this section. The Wiener-Hopf MMSE-criterion takes the first partial-derivative of the mean-square-error (MSE) with respect to its weight-vector, i.e., the gradient of the MSE, set the result of this derivation to zero and solves the equation. We will show, as an example, in the remainder of this section this procedure, i.e., the Wiener-Hopf criterion, to compute the steering-vector of the transmitted desired-signal x.

The multi(two)-antennae received desired-signal is given by;

$$\underline{s} = \underline{x} + \underline{\eta} = \underline{a}x + \underline{\eta} \qquad \text{Eq. 1}$$

With $\underline{\eta}$ the multi(two)-antennae (dimensional) zero-mean complex white Gaussian noise-signal vector with noise-variance $\sigma_\eta^2$ for each vector-component. Further, we assume that the received desired-signal $\underline{s}$ is a "point-source signal" with a steering-vector $\underline{a}$. Now, by applying a weighing-vector $\underline{w}$ on the received desired-signal $\underline{s}$ we might obtain an (noisy) estimate of the transmitted desired-signal x, given by;

$$\hat{x} = \underline{w}^H \underline{s} = (\underline{w}^H \underline{a})x + \underline{w}^H \underline{\eta} \qquad \text{Eq. 2}$$

where $(\cdot)^H$ is the Hermitian transpose, i.e., apply both the complex-conjugate $(\cdot)^*$ and the transpose $(\cdot)^T$ operation. We now define the MSE of the estimation of the transmitted desired-signal $\hat{x}$ by;

$$MSE \stackrel{\text{def}}{=} \varepsilon(\underline{w}) = E\{(x-\hat{x})(x^*-\hat{x}^*)\} \stackrel{\Delta}{=} E\{(x-\underline{w}^H\underline{s})(x^*-\underline{s}^H\underline{w})\} \qquad \text{Eq. 3}$$

Where $E\{\cdot\}$ means statistical average. Further evaluation of Eq. 3 yields;

$$\varepsilon(\underline{w}) = E\{|x|^2\} - \underline{w}^H E\{\underline{s}x^*\} - E\{\underline{s}^H x\}\underline{w} + \underline{w}^H E\{\underline{s}\underline{s}^H\}\underline{w}$$
$$\stackrel{\text{def}}{=} \sigma_x^2 - \underline{w}^H \underline{v}_{sx^*} - \underline{v}_{sx^*}^H \underline{w} + \underline{w}^H \tilde{R}_{ss}\underline{w} \qquad \text{Eq. 4}$$

with $\sigma_x^2$ is the variance of the transmitted-signal x, $\underline{v}_{sx^*} = E\{\underline{s}x^*\}$ is the spatial cross-correlation vector, and $\tilde{R}_{ss} = E\{\underline{s}\underline{s}^H\}$ is the spatial-covariance matrix.

Recall that the Wiener-Hopf criterion computes the gradient of the MSE and sets the result to zero. Hence, the gradient of the MSE, given by Eq. 4, with respect to $\underline{w}^H$ becomes;

$$\nabla \varepsilon_{\underline{w}^H} \stackrel{\text{def}}{=} \frac{\partial \varepsilon(\underline{w})}{\partial \underline{w}^H} = -\underline{v}_{sx^*} + \tilde{R}_{ss}\underline{w} \qquad \text{Eq. 5}$$

and by setting the gradient to zero $$\nabla \varepsilon_{\underline{w}}H = -v_{sx^*} + \tilde{R}_{ss}\underline{w} = \underline{0} \xrightarrow{yields} \tilde{R}_{ss}\underline{w}_{opt} = v_{sx^*} \qquad \text{Eq. 6}$$

gives, indeed, the well-known Wiener-Hopf solution.

By the previously made assumption that the received desired-signal $\underline{s}$ is a noisy point-source signal with steering-vector $\underline{a}$, i.e., $\underline{s}=\underline{a}x+\underline{n}$, we can rewrite the spatial cross-correlation vector as;

$$v_{\underline{s}x^*}=E\{\underline{s}x^*\}=E\{(\underline{a}x+\underline{n})x^*\}=\sigma_x^2 \cdot \underline{a} \qquad \text{Eq. 7}$$

which is a "scaled-version" (with the variance of the transmitted desired-signal x) of the steering-vector $\underline{a}$. Combining it with Eq. 6 gives;

$$\tilde{R}_{ss}\underline{w}_{opt}=\sigma_x^2 \cdot \underline{a} \stackrel{\triangleq}{=} \lambda \underline{w}_{opt} \qquad \text{Eq. 8}$$

This turns out to be what we, actually, need to solve an Eigen-value problem. The solution of this Eigen-value problem provides the optimal weight-vector. Moreover, this optimal weight-vector represents the steering-vector of the transmitted desired-signal x and might, therefore, be given by;

$$\underline{w}_{opt}=P\{\tilde{R}_{ss}\} \propto \underline{a} \qquad \text{Eq. 9}$$

Where $P\{\cdot\}$ is the operator that returns the principal Eigen-vector of a matrix based on the pca, which is proportional to the steering-vector $\underline{a}$.

With a two antennae Uniform-Linear-Array (ULA,) the spatial-covariance matrix $R_{ss}$ is a 2-by-2 matrix where the characteristic-function to compute the Eigen-vectors of the desired received-signal $\underline{s}$ is only a "straight-forward" quadratic-function that needs to be solved. This quadratic-function is given by;

$$\lambda^2 - tr\{A\}\lambda + det\{A\} = 0 \Rightarrow \lambda_{1,2} = \frac{tr\{A\} \pm \sqrt{tr^2\{A\} - 4 \cdot det\{A\}}}{2} \qquad \text{Eq. 10}$$

where $A \triangleq \tilde{R}_{ss}$, $tr\{A\}$ is the trace of matrix A, and $det\{A\}$ is the determinant of matrix A.

Now the first (largest) principal Eigen-vector $\underline{w}_{opt}$ representing the steering-vector $\underline{a}$ can be found, according to the Cayley-Hamilton theorem, by exploiting the columns of the solution-matrix $(A-\lambda_2 I)$ where $\lambda_2$ is the smallest Eigen-value out of the quadratic-function of Eq. 10. Working-out this procedure shows indeed that the principal Eigen-vector $\underline{w}_{opt}$ is proportional to the steering-vector $\underline{a}$ of the received desired-signal. In addition, similar results can be derived in a similar-way for the received lower 1st adjacent (FM)-interference-signal with spatial-covariance matrix $\tilde{R}_{ii}$ and the received upper 1st adjacent (FM)-interference-signal with spatial-covariance matrix $\tilde{R}_{jj}$.

It is recalled that the processing for obtaining these spatial-covariance matrices is based on the earlier mentioned surrogate-signals (i.e. subsets of the associated frequency-bins) . . . .

Finally, for practical considerations, an approximation of the spatial-covariance matrix is used. For this approximation, the infinity-length statistical average operator $E\{\cdot\}$ will be replaced by a finite running-length sum-average, which yields a sample-based spatial-covariance matrix and is given by;

$$R_{ii} \triangleq \frac{1}{N}\sum_{n=1}^{N}(\hat{\underline{i}}[n] \cdot \hat{\underline{i}}^H[n]) \approx \tilde{R}_{ii} \quad \text{for the lower interference,}$$

$$R_{ss} \triangleq \frac{1}{N}\sum_{n=1}^{N}(\hat{\underline{s}}[n] \cdot \hat{\underline{s}}^H[n]) \approx \tilde{R}_{ss} \quad \text{for the desired signal,}$$

$$R_{jj} \triangleq \frac{1}{N}\sum_{n=1}^{N}(\hat{\underline{j}}[n] \cdot \hat{\underline{j}}^H[n]) \approx \tilde{R}_{jj} \quad \text{for the upper interference,} \qquad \text{Eq. 11}$$

where $\hat{\underline{i}}[n]$ is the stream of sample-vectors for the surrogate of the received lower 1st adjacent (FM)-interference-signal, $\hat{\underline{s}}[n]$ is the stream of sample-vectors for the surrogate of the received desired-signal, and $\hat{\underline{j}}[n]$ is the stream of sample-vectors for the surrogate of the received upper 1st adjacent (FM)-interference-signal and are provided as outputs of steps 772, 768, 774 shown in FIG. 7.

These sample-based spatial-covariance matrices $\tilde{R}_{ii}$, $\tilde{R}_{ss}$, $\tilde{R}_{jj}$ are provided as outputs of steps 776, 778, 780 shown in FIG. 7, and are used for calculating, for example, the combination-weighting-values and for the suppression-weighting-values by the maximization of SINR criterion.

The co-variance matrix may be used as a measure for the signal power of the desired signal and of the interference signal. As discussed herein, the beamformer maximizes the signal for SINR, the maximum power of the desired signal and minimum contribution of the interference plus noise, because this will result in a determination of the directionality; this condition will correspond to the direction of origination of the signal.

Calculation of Suppression-weighting-values

Now, the suppression-weighting-values are calculated at step 753. The suppression-weighting-values comprises three subsets of values (one for each of the frequency bins): first- second- and third-suppression-weighting-values, which represent the steering-vectors computed by the sample-based spatial-covariance matrices and can then be written as;

$$\underline{w}_{opt,i}=P\{R_{ii}\} \stackrel{\triangleq}{=} \underline{sv}_i \text{ for the lower interference,}$$

$$\underline{w}_{opt,s}=P\{R_{ss}\} \stackrel{\triangleq}{=} \underline{sv}_s \text{ for the desired signal,}$$

$$\underline{w}_{opt,j}=P\{R_{jj}\} \stackrel{\triangleq}{=} \underline{sv}_j \text{ for the upper interference,} \qquad \text{Eq. 12}$$

where the Eigen-vectors are computed by solving the quadratic characteristic-functions for each of the three surrogate signals in the three different frequency-bins. As a result we obtain the three steering-vectors, $\{\underline{sv}_j, \underline{sv}_s, \underline{sv}_j\}$.

The following description relates to an implementation of how the maximization of SINR criterion in block 753 can determine the suppression-weighting-values (which may also be known as weighting-coefficients or beamforming weights). Note that these are the beamforming weights that are used for the three frequency-bins if no "overruling" occurs.

The generation of weighting coefficients by complex digital base-band beamforming with double-null steering by maximizing the SINR may be as follows. Note the estimation-criterion is the maximization of the SINR, which computes the optimal weights by taking the first derivative of the Signal-to-Interference+Noise-Ratio (SINR); the result of this derivative may be set to zero which may solve the equation. The SINR may be expressed as $$SINR \stackrel{def}{=} \frac{\underline{w}^H R_{ss} \underline{w}}{\underline{w}^H R_{in} \underline{w}} \qquad \text{(equation 13)}$$

where $\underline{w}$ are the weights, $(\cdot)^H$ is the Hermitian transpose, i.e., both the complex-conjugate and the transpose operation, and $$R_{ss} \overset{\Delta}{=} \frac{1}{N}\sum_{n=1}^{N}(\underline{s}[n]\cdot \underline{s}^H[n]), \quad \text{(eq. 14)}$$

$$R_{in} \overset{\Delta}{=} \frac{1}{N}\sum_{n=1}^{N}(\{\underline{i}[n]+\underline{n}[n]\}\cdot\{\underline{i}[n]+\underline{n}[n]\}^H)$$

are the sample co-variance matrices (an approximation of the co-variance matrices over a finite number of samples N), and $\underline{n}[n]$ represents complex-Gaussian noise vector with zero-mean and variance $\sigma^2 = N_0$ for each of the components. In an example case the sample co-variance matrix $R_{in}$ may not be available, however, for an IBOC transmission the representative signals may be used to obtain an approximation of the sample co-variance matrix $R_{in}$ (and also for the sample co-variance matrix $R_{jn}$), yielding:

$$R_{in} \approx R_{ii} \overset{\Delta}{=} \frac{1}{N}\sum_{n=1}^{N}(\hat{\underline{i}}[n]\cdot\hat{\underline{i}}^H[n]) \quad \text{lower interference} \quad \text{(eq. 15)}$$

$$R_{ss} \approx R_{\hat{s}\hat{s}} \overset{\Delta}{=} \frac{1}{N}\sum_{n=1}^{N}(\hat{\underline{s}}[n]\cdot\hat{\underline{s}}^H[n]) \quad \text{desired signal}$$

$$R_{jn} \approx R_{jj} \overset{\Delta}{=} \frac{1}{N}\sum_{n=1}^{N}(\hat{\underline{j}}[n]\cdot\hat{\underline{j}}^H[n]) \quad \text{upper interference}$$

where $\hat{\underline{i}}[n]$ is the stream of samples for the surrogate of the lower $1^{st}$ adjacent interference signal, $\hat{\underline{s}}[n]$ is the stream of samples for the surrogate of the desired signal, and $\hat{\underline{j}}[n]$ is the stream of samples for the surrogate of the upper $1^{st}$ adjacent interference signal.

An IBOC transmission with two $1^{st}$ adjacent interference signals (and, in some embodiments, complex-Gaussian noise) may be expressed as a summation of three spatial different and independent signals, i.e., the lower $1^{st}$ adjacent interference signal, the desired signal, and the upper $1^{st}$ adjacent interference signal with independent complex-Gaussian noise. Thus, the SINR may be expressed as $$SINR_{HIBOC} \overset{def}{=} \quad \text{(eq. 16)}$$

$$E\left\{\frac{\underline{w}^H R_{ss}\underline{w}}{\underline{w}^H R_{inj}\underline{w}}\right\} \approx \frac{1}{3}\left(\frac{\underline{w}_i^H R_{ss}\underline{w}_i}{\underline{w}_i^H R_{ii}\underline{w}_i} + \frac{\underline{w}_s^H R_{ss}\underline{w}_s}{\underline{w}_s^H R_{nn}\underline{w}_s} + \frac{\underline{w}_j^H R_{ss}\underline{w}_j}{\underline{w}_j^H R_{jj}\underline{w}_j}\right)$$

where $E\{\cdot\}$ is an expression of the statistical average. The optimum weighing-coefficients, i.e., the weight-vector may be obtained by maximizing the $$SINR, \underline{w}_{opt} \overset{def}{=} \underset{\underline{w}}{\operatorname{argmax}}\{SINR\} = \underset{w}{\operatorname{argmax}}\left\{\frac{\underline{w}^H R_{ss}\underline{w}}{\underline{w}^H R_{in}\underline{w}}\right\}. \quad \text{(eq. 17)}$$

For a received IBOC transmission, such as the transmission 100 shown in FIG. 1, the interference-signals 120, 130 and the desired signal 110 may be separated into different frequency-bins, so that for each frequency-bin the SINR will be optimized to obtain the weights, such that:

$$\underline{w}_{opt,i} \overset{def}{=} \underset{\underline{w}_i}{\operatorname{argmax}}\left\{\frac{\underline{w}_i^H R_{ss}\underline{w}_i}{\underline{w}_i^H R_{ii}\underline{w}_i}\right\} \quad \text{lower interference} \quad \text{(eq. 18)}$$

$$\underline{w}_{opt,s} \overset{def}{=} \underset{\underline{w}_s}{\operatorname{argmax}}\left\{\frac{\underline{w}_s^H R_{ss}\underline{w}_s}{\underline{w}_s^H R_{nn}\underline{w}_s}\right\} \quad \text{desired signal}$$

$$\underline{w}_{opt,j} \overset{def}{=} \underset{\underline{w}_j}{\operatorname{argmax}}\left\{\frac{\underline{w}_j^H R_{ss}\underline{w}_j}{\underline{w}_j^H R_{jj}\underline{w}_j}\right\} \quad \text{upper interference}$$

which may be considered the initial step to calculate the weighting coefficients in three sub-bands. To solve the maximization problem the complex gradient of the SINR for each bin may be taken with respect to the complex-weights and the result set to zero, which yields, for example, for the lower 1st adjacent interference signal $$\nabla_{\underline{w}_i^H}\left\{\frac{\underline{w}_i^H R_{ss}\underline{w}_i}{\underline{w}_i^H R_{ii}\underline{w}_i}\right\} = \nabla_{\underline{w}_i^H}\left\{(\underline{w}_i^H R_{ss}\underline{w}_i)(\underline{w}_i^H R_{ii}\underline{w}_i)^{-1}\right\} = 0 \quad \text{(eq. 19)}$$

where $\nabla\{\cdot\}$ is the expression for taking the complex gradient. Applying partial-differentiation may result in $$R_{ss}\underline{w}_i(\underline{w}_i^H R_{ii}\underline{w}_i)^{-1} - (\underline{w}_i^H R_{ii}\underline{w}_i)^{-2} R_{ii}\underline{w}_i(\underline{w}_i^H R_{ss}\underline{w}_i) = 0 \quad \text{(eq. 20)},$$

which may be rewritten as the expression $$R_{ss}\underline{w}_i(\underline{w}_i^H R_{ii}\underline{w}_i)^{-1} = \quad \text{(eq. 21)}$$

$$(\underline{w}_i^H R_{ii}\underline{w}_i)^{-2} R_{ii}\underline{w}_i(\underline{w}_i^H R_{ss}\underline{w}_i) \Rightarrow R_{ss}\underline{w}_i = R_{ii}\underline{w}_i \frac{\underline{w}_i^H R_{ss}\underline{w}_i}{\underline{w}_i^H R_{ii}\underline{w}_i} \overset{\Delta}{=} R_{ii}\underline{w}_i\lambda_i$$

where $$\lambda_i \overset{def}{=} \frac{s}{i+n} = \frac{\underline{w}_i^H R_{ss}\underline{w}_i}{\underline{w}_i^H R_{ii}\underline{w}_i} \quad \text{(eq. 22)}$$

may be defined as the SINR of the frequency-bin for the lower 1st adjacent interference signal. This may be rewritten as $$R_{ss}\underline{w}_i = R_{ii}\underline{w}_i\lambda_i \Rightarrow (R_{ii}^{-1} R_{ss})\underline{w}_i = \lambda_i\underline{w}_i \quad \text{(eq. 23)}$$

which is an Eigen-value problem whose solution provides the optimal weights for maximizing the SINR:

$$\underline{w}_{opt,i} = P\{R_{ii}^{-1} R_{ss}\} \quad \text{(eq. 24)},$$

where $P\{\cdot\}$ is the operator that returns the principal Eigen-vector of a matrix based on the PCA.

With a two-antenna ULA, the sample co-variance matrix may be a 2-by-2 matrix and the characteristic-function to compute the Eigen-vectors is a quadratic-function expressed as $$\lambda^2 - tr\{A\}\lambda + det\{A\} = \quad \text{(eq. 2825)}$$

$$0 \Rightarrow \lambda_{1,2} = \frac{tr\{A\} \pm \sqrt{tr\{A\}^2 - 4\cdot det\{A\}}}{2}$$

where $$A \overset{\Delta}{=} R_{ii}^{-1} R_{ss}, \; tr\{A\}$$

is the trace of matrix A, and $det\{A\}$ is the determinant of matrix A.

Similar results may be derived in a similar-way for the desired signal and the upper $1^{st}$ adjacent interference signal.

However, the sample co-variance matrix $R_{nn}$ of independent zero-mean complex-Gaussian noise variables may be assumed to be a diagonal-matrix with noise variances $\sigma^2$ on the main-diagonal. Note the desired signal may not have an interference signal (one reason why it is used for the training signal). By taking the inverse of the noise-matrix there will be values only on the main diagonal, such that the desired signal will be scaled, but will not change the Eigen-vectors. Therefore, the inverse sample covariance matrix $R_{nn}^{-1}$ may also be expressed as a diagonal matrix and $$R_{nn}^{-1}R_{ss} \propto R_{ss} \Rightarrow \underline{w}_{opt,s} = P\{R_{nn}^{-1}R_{ss}\} \propto P\{R_{ss}\} \qquad \text{(eq. 26)}$$

Finally, the optimal weights for the lower and upper 1st adjacent interference signal and the desired signal may be expressed as:

$$\underline{w}_{opt,i} = P\{R_{ii}^{-1}R_{ss}\} \text{ lower interference}$$

$$\underline{w}_{opt,s} = P\{R_{ss}\} \text{ desired signal}$$

$$\underline{w}_{opt,j} = P\{R_{jj}^{-1}R_{ss}\} \text{ upper interference} \qquad \text{(eq. 27)}$$

where the Eigen-vectors are computed by solving "straightforward" quadratic characteristic-functions for each of the three frequency-bins"). These "optimal weights" are the outputs of step 753, and also the outputs of the suppression-weights-calculator of FIG. 6.

The suppression-weighting-values can be considered to comprise: outer-suppression-weighting-values and middle-suppression-weighting-values. The middle-suppression-weighting-values include values for application to a middle-frequency-bin of the first-BF-input-signal and the second-BF-input-signal in order to constructively combine the middle-frequency-bin of the first-BF-input-signal and the second-BF-input-signal. The outer-suppression-weighting-values include values for application to an outer-frequency-bin of the first-BF-input-signal and the second-BF-input-signal in order to destructively combine the outer-frequency-bin of the first-BF-input-signal and the second-BF-input-signal. The outer-suppression-weighting-values can comprise lower-suppression-weighting-values and upper-suppression-weighting-values. The lower-suppression-weighting-values can include values for application to a lower-frequency-bin of the first-BF-input-signal and the second-BF-input-signal in order to destructively combine the lower-frequency-bin of the first-BF-input-signal and the second-BF-input-signal. The upper-suppression-weighting-values can include values for application to an upper-frequency-bin of the first-BF-input-signal and the second-BF-input-signal in order to destructively combine the upper-frequency-bin of the first-BF-input-signal and the second-BF-input-signal.

Calculation of Combination-weighting-values

The combination-weighting-values are calculated at step 751. The combination-weighting-values comprises three subsets of values (one for each of the frequency bins): first-, second- and third-combination-weighting-values ($c_{opt,i}$, $c_{opt,s}$, $c_{opt,j}$).

In this example the step of setting the combination-weighting-values utilises at least some of the information that was calculated by step 753 when determining the suppression-weighting-values.

The step of determining the suppression-weighting-values for maximizing SINR 753 can be summarised as: setting the first-suppression-weighting-values ($w_{opt,i}$) as values for destructively combining the information that corresponds to the first-frequency-bins of the plurality of antenna-signals; setting the second-suppression-weighting-values ($w_{opt,s}$) as values for constructively combining the information that corresponds to the second-frequency-bins of the plurality of antenna-signals; and setting the third-suppression-weighting-values ($w_{opt,j}$) as values for destructively combining the information that corresponds to the third-frequency-bins of the plurality of antenna-signals, see above for more details.

The step of determining the combination-weighting-values for constructively combining each of the three frequency bins 751 can involve setting the first-combination-weighting-values ($c_{opt,i}$) and the third-combination-weighting-values ($c_{opt,j}$) as the same values that were set for the second-weighting-values ($w_{opt,s}$) at step 753 (determining weighting-values for maximizing SINR). This can be considered as over-ruling the destructive first- and second-weighting-values that were determined at step 753. The second-combination-weighting-values ($c_{opt,s}$) are also set as the same values that were set for the second-weighting-values ($w_{opt,s}$) at step 753.

In this example, the first-, second- and third-weighting-values (for both combination and suppression) each comprise a plurality of antenna-weighting-values, one for each of the plurality of antenna-signals. Each of the antenna-weighting-values may be a complex number.

The combination-weighting-values can be considered to comprise: lower-combination-weighting-values, middle-combination-weighting-values and upper-combination-weighting-values. The lower-combination-weighting-values can include values for application to a lower-frequency-bin of the first-BF-input-signal and the second-BF-input-signal in order to constructively combine the lower-frequency-bin of the first-BF-input-signal and the second-BF-input-signal. The middle-combination-weighting-values can include values for application to a middle-frequency-bin of the first-BF-input-signal and the second-BF-input-signal in order to constructively combine the middle-frequency-bin of the first-BF-input-signal and the second-BF-input-signal. The upper-combination-weighting-values can include values for application to an upper-frequency-bin of the first-BF-input-signal and the second-BF-input-signal in order to constructively combine the upper-frequency-bin of the first-BF-input-signal and the second-BF-input-signal.

For the received desired-signal, a beamformer that applies the weighting-values generated by step 753 for maximizing SINR might compute the weighting-values as optimal beam-forming weights to perform a constructive-adding of the received desired-signal at the ULA, i.e., it "constructively-combines" the multi(two)-antennae desired output-signals.

Generating the BFC and BFS Signals

As indicated above, the method of FIG. 7 includes three frequency-splitting-paths: a first-frequency-splitting-path 757, a second-frequency-splitting-path 759 and a third-frequency-splitting-path 761.

The first-frequency-splitting-path 757 is for isolating the first-frequency-bins of each of the plurality of antenna-signals. The second-frequency-splitting-path 759 is for isolating the second-frequency-bins of each of the plurality of antenna-signals. The third-frequency-splitting-path 761 is for isolating the third-frequency-bins of each of the plurality of antenna-signals. Once these frequency bins have been isolated, the associated combination-weighting-values and the suppression-weighting values can be applied.

In the first-frequency-splitting-path 757, a first step 786 of frequency shifting by +200 kHz is performed so that the center of the first-frequency-bin of each antenna-signal is located at 0 Hz. Then at step 792, the frequency shifted signals provided by step 786 are low-pass filtered (LPF) by a filter with a cut-off frequency of 100 kHz, centered around 0 Hz (i.e. from −100 kHz to 100 kHz) with a finite impulse response (FIR) of 32-taps in this example. As a result, the output signals from the filtering at step 792 will include the entire first-frequency-bin. These output signals can be considered as first-frequency-bin-antenna-signals.

Similarly, in the third-frequency-splitting-path 761, a first step 790 of frequency shifting by −200 kHz is performed so that the center of the third-frequency-bin of each antenna-signal is located at 0 Hz. Then at step 794, the frequency shifted signals provided by step 790 are low-pass filtered (LPF) by a filter with a cut-off frequency of 100 kHz, centered around 0 Hz (i.e. from −100 kHz to 100 kHz) with a finite impulse response (FIR) of 32-taps in this example. As a result, the output signals from the filtering at step 794 will include the entire third-frequency-bin. These output signals can be considered as third-frequency-bin-antenna-signals.

In the second-frequency-splitting-path 759, a frequency shifting step is not required because the center of the second-frequency-bin of each antenna-signal is already located at 0 Hz. At step 798, the antenna signals are low-pass filtered (LPF) by a filter with a cut-off frequency of 100 kHz, centered around 0 Hz (i.e. from −100 kHz to 100 kHz) with a finite impulse response (FIR) of 32-taps in this example. As a result, the output signals from the filtering at step 798 will include the entire second-frequency-bin. These output signals can be considered as second-frequency-bin-antenna-signals.

The BFS Signal

The method of FIG. 7 includes a first-suppression-weighting-application-step 718 that applies the first-suppression-weighting-values ($w_{opt,t}$) to the first-frequency-bin-antenna-signals in order to combine the signals and provide a weighted-suppression-first-frequency-bin-signal. In this way the first-suppression-weighting-values are applied to information that corresponds to the first-frequency-bin in the plurality of antenna-signals in order to destructively combine the signals.

Similarly, a third-suppression-weighting-application-step 746 applies the third-suppression-weighting-values ($w_{opt,j}$) to the third-frequency-bin-antenna-signals in order to combine the signals and provide a weighted-suppression-third-frequency-bin-signal. In this way the third-suppression-weighting-values are applied to information that corresponds to the third-frequency-bin in the plurality of antenna-signals in order to destructively combine the signals.

A second-suppression-weighting-application-step 726 applies the third-suppression-weighting-values ($w_{opt,s}$) to the second-frequency-bin-antenna-signals in order to combine the signals and provide a weighted-suppression-second-frequency-bin-signal. In this way the second-suppression-weighting-values are applied to information that corresponds to the second-frequency-bin in the plurality of antenna-signals in order to constructively combine the signals.

A suppression-signal-combining step 734 then combines the weighted-suppression-first-frequency-bin-signal, the weighted-suppression-second-frequency-bin-signal, and the weighted-suppression-third-frequency-bin-signal. In this example, since frequency shifting was applied in the first-frequency-splitting-path 757 and the third-frequency-splitting-path 761, a corresponding reverse frequency shift is applied to each of the weighted-suppression-first-frequency-bin-signal and the weighted-suppression-third-frequency-bin-signal before the three signals are combined. The output of the suppression-signal-combining step 734 is the BFS-signal 730a, with an improved SINR, if interference is present.

The BFC Signal

The BFC signal 728a is generated in a similar way to the BFS signal 730a, using the combination-weighting-values instead of the suppression-weighting-values.

The method of FIG. 7 includes a first-combination-weighting-application-step 717 that applies the first-combination-weighting-values ($c_{opt,i}$) to the first-frequency-bin-antenna-signals in order to combine the signals and provide a weighted-combination-first-frequency-bin-signal. In this way the first-combination-weighting-values are applied to information that corresponds to the first-frequency-bin in the plurality of antenna-signals in order to constructively combine the signals.

Similarly, a third-combination-weighting-application-step 745 applies the third-combination-weighting-values ($c_{opt,j}$) to the third-frequency-bin-antenna-signals in order to combine the signals and provide a weighted-combination-third-frequency-bin-signal. In this way the third-combination-weighting-values are applied to information that corresponds to the third-frequency-bin in the plurality of antenna-signals in order to constructively combine the signals.

A second-combination-weighting-application-step 725 applies the second-combination-weighting-values ($c_{opt,s}$) to the second-frequency-bin-antenna-signals in order to combine the signals and provide a weighted-combination-second-frequency-bin-signal. In this way the second-combination-weighting-values are applied to information that corresponds to the second-frequency-bin in the plurality of antenna-signals in order to constructively combine the signals.

A combination-signal-combining step 733 then combines the weighted-combination-first-frequency-bin-signal, the weighted-combination-second-frequency-bin-signal, and the weighted-combination-third-frequency-bin-signal. In this example, since frequency shifting was applied in the first-frequency-splitting-path 757 and the third-frequency-splitting-path 761, a corresponding reverse frequency shift is applied to each of the weighted-combination-first-frequency-bin-signal and the weighted-combination-third-frequency-bin-signal before the three signals are combined. The output of the combination-signal-combining step 733 is the BFC-signal 728a.

Once the BFC-signal 728a and the BFS-signal 730a have been generated, the method checks at step 710 as to whether or not there are any more blocks of data to be processed. If there are, then the method returns to step 754. If there are not, then the method ends at step 711.

These two output-signals 728a, 730a of the BF device will be applied to a MRC-device that combines these signal-streams in a "weighed-fashion" with signal-quality indicators in the form of, for example, bit-metrics. The MRC-device can therefore make an efficient choice, in terms of SINR, based on beamforming with suppression and combining capabilities. Beneficially, the beamformer does not need to decide which of the BFC-signal 728a and the BFS-signal 730a provides the best output—this is handled inherently by the MRC processing. This is because the MRC-block can advantageously (in some examples optimally) combine the signal-energy of the BFC-signal 728a and the BFS-signal 730a.

Embodiments described herein can be considered as optimizing the SINR by combining the output-signals, e.g., the BFS-signal and the BFC-signal, of a (electronically-steered complex base-band) beamforming approach with the help of the MRC-technique. This optimization of SINR by BF for MRC, may be referred to as BF4MRC.

One or more of the beamformers disclosed herein compute optimal beamforming suppression-weights to perform a constructive-adding of the received desired-signal at the ULA, i.e., it "constructively-combines" the multi(two)-antennae desired output-signals. There is a lack-of-spatial information if the angle-of-arrival (AoA) of the desired-signal and the AoA of either one or both of the interference-signals have similar values, i.e., they are spatially quite close. The fact that there is lack-of-spatial information, actually, means that a beamforming algorithm that applies suppression-weighting-values may not (in itself) be capable of distinguishing between (spatially) different signals.

It has been found that it would be appropriate to apply a "constructive-combining" on the interference-signals that have the similar AoA as the desired-signal, instead of destructively combining them. The combination-weighting-values described above are used for this type of combining. Moreover, this is an appropriate choice due to the fact that the beamformer is anyway not able to make a spatial distinction between these signals. The combination-weighting-values for such constructive-combining in some examples are already available, since they are computed as the second-suppression-weighting-values for the received desired signal. Thus, if the optimal-weights of the desired-signal are used as combination-weighting-values for the lower $1^{st}$-adjacent interference-signal as well as for the upper $1^{st}$-adjacent interference-signal, then all the signals are constructively-combined. This output-signal of the beamforming procedure is identified as a BFC-signal herein.

However, the input-signal of the beamforming process might be contaminated with interference-signals that could be efficiently-suppressed by a beamforming process. In this case it might be appropriate to apply the optimal-weights based on suppression of the interference-signal at the lower frequency-bin, or on the interference-signal at the upper frequency-bin, or on the interference-signals at both bins. This is described above as calculating the first- and third-suppression-weighting-values, and generating a BFS-signal.

Thus, the beamforming approach described with reference to FIGS. 5, 6 and 7 can be considered as an expansion of a beamforming approach that only provides a BFS-signal for suppression, in that it also provides a second output-signal (the BFC-signal) where the optimal combining-weights of the middle frequency-bin are applied, i.e., copied, to the lower frequency-bin as well as to the upper frequency-bin.

Now, these two output-signals of the beamforming procedure, i.e., the BFC-signal and the BFS-signal can be applied as input-signals to an MRC-procedure. The MRC-procedure in some examples computes bit-metrics of the BFC-signal as well as of the BFS-signal and adds these bit-metrics together. Since the bit-metrics represent the signal-quality in the sense of SNR, hence, the MRC-procedure is actually performing a quality-weighting addition of the BFC-signal and the BFS-signal, i.e., the BF4MRC-procedure.

Thus, for the BF4MRC-procedure, the following-scenarios might be of interest;
  a) if there are no interference-signals, then the "BFC-signal-quality might be similar to the BFS-signal-quality", i.e., in bit-metric sense by applying appropriate (H)IBOC-receiver-processing,
  b) if there are interference-signals without a lack-of-spatial information (that is, the interference signals and desired signal are received at sufficiently similar angles of arrival), then the "BFS-signal-quality might be higher than the BFC-signal-quality", i.e., in bit-metric sense by applying appropriate (H)IBOC-receiver-processing,
  c) if there are interference-signals with lack-of-spatial information (that is, the interference signals and desired signal are received at a similar angle of arrival), then the "BFC-signal-quality might be higher than the BFS-signal-quality", i.e., in bit-metric sense by applying appropriate (H)IBOC-receiver-processing,
and the MRC-procedure will perform a "weighted-addition of the bit-metrics" accordingly. Hence, the BF4MRC-procedure will try to optimize the SINR by using the suppressed-signal (BFS-signal) as well as the combined-signal (BFC-signal) provided by the beamforming procedure as inputs to an MRC-procedure, such that the MRC-procedure can weight the two signals beneficially in the sense of SNR.

Therefore, examples disclosed herein can: i) improve the suppression of (and preferably complete remove) the 1st adjacent (FM)-interference-signals, thereby improving SINR, ii) improve the received signal-power of the desired (H)IBOC-signal, which is transmitted in the hybrid-mode as well as in the all-digital mode, and iii) provide better performances when compared with using beamforming or MRC individually.

In this way, an (electronically steered) beamformer is able to remove or significantly reduce both 1st-adjacent interference-signals by double-null-steering, whilst also being capable of combining the desired (H)IBOC-signal. The interference-suppression can be accomplished with an ULA consisting of only two isotropic-elements spaced by half the wavelength of the carrier-frequency, e.g., $f_c$=100 MHz→λ≈3 m for transmissions within the FM-band. The double-null-steering can be achieved because both the 1st-adjacent interference-signals and the desired (H)IBOC-signal are separated in three different frequency-bins as described herein.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, Internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver circuit comprising:
    a beamformer configured to receive a first-beamformer (BF)-input-signal and a second-BF-input-signal, the beamformer comprising:
        a combination-weights-calculator configured to process the first-BF-input-signal and the second-BF-input-signal in order to determine combination-weighting-values;
        a suppression-weights-calculator configured to process the first-BF-input-signal and the second-BF-input-signal in order to determine suppression-weighting-values;
        a beamformer combination (BFC)-signal-generator configured to apply the combination-weighting-values to the first-BF-input-signal and the second-BF-input-signal in order to provide a BF-combination-signal; and
        a beamformer suppression (BFS)-signal-generator configured to apply the suppression-weighting-values to the first-BF-input-signal and the second-BF-input-signal in order to provide a BF-suppression-signal; and
    a Maximal Ratio Combining (MRC)-block comprising:
        a first-demodulator configured to demodulate the BF-combination-signal in order to provide a demodulated-combination-signal that comprises bit metrics;
        a second-demodulator configured to demodulate the BF-suppression-signal in order to provide a demodulated-suppression-signal that comprises bit metrics; and
        a combiner configured to combine the demodulated-combination-signal with the demodulated-suppression-signal in order to provide an MRC-output-signal.

2. The receiver circuit of claim 1, wherein the combination-weighting-values comprise values for application to the first-BF-input-signal and the second-BF-input-signal in order to constructively combine the first-BF-input-signal and the second-BF-input-signal.

3. The receiver circuit of claim 2, wherein the combination-weighting-values comprise:
    lower-combination-weighting-values that include values for application to a lower-frequency-bin of the first-BF-input-signal and the second-BF-input-signal in order to constructively combine the lower-frequency-bin of the first-BF-input-signal and the second-BF-input-signal;
    middle-combination-weighting-values that include values for application to a middle-frequency-bin of the first-BF-input-signal and the second-BF-input-signal in order to constructively combine the middle-frequency-bin of the first-BF-input-signal and the second-BF-input-signal; and
    upper-combination-weighting-values that include values for application to an upper-frequency-bin of the first-BF-input-signal and the second-BF-input-signal in order to constructively combine the upper-frequency-bin of the first-BF-input-signal and the second-BF-input-signal.

4. The receiver circuit of claim 1, wherein the suppression-weighting-values comprise first-values for application to the first-BF-input-signal and the second-BF-input-signal in order to destructively combine one or more frequency bins of the first-BF-input-signal and the second-BF-input-signal.

5. The receiver circuit of claim 4, wherein the suppression-weighting-values also comprise second-values for application to the first-BF-input-signal and the second-BF-input-signal in order to constructively combine one or more other frequency bins of the first-BF-input-signal and the second-BF-input-signal.

6. The receiver circuit of claim 1, wherein the suppression-weighting-values comprise:
    outer-suppression-weighting-values that include values for application to an outer-frequency-bin of the first-BF-input-signal and the second-BF-input-signal in order to destructively combine the outer-frequency-bin of the first-BF-input-signal and the second-BF-input-signal;
    middle-suppression-weighting-values that include values for application to a middle-frequency-bin of the first-BF-input-signal and the second-BF-input-signal in order to constructively combine the middle-frequency-bin of the first-BF-input-signal and the second-BF-input-signal.

7. The receiver circuit of claim 6, wherein the outer-suppression-weighting-values comprise:
    lower-suppression-weighting-values that include values for application to a lower-frequency-bin of the first-BF-input-signal and the second-BF-input-signal in order to destructively combine the lower-frequency-bin of the first-BF-input-signal and the second-BF-input-signal; and/or
    upper-suppression-weighting-values that include values for application to an upper-frequency-bin of the first-BF-input-signal and the second-BF-input-signal in order to destructively combine the upper-frequency-bin of the first-BF-input-signal and the second-BF-input-signal.

8. The receiver circuit of claim 6, wherein the combination-weights-calculator is configured to set the combination-weighting-values as the middle-suppression-weighting-values.

9. The receiver circuit of claim 1, wherein the suppression-weights-calculator is configured to determine the suppression-weighting-values by applying a maximization of signal to interference noise ratio (SINR) criterion algorithm.

10. The receiver circuit of any preceding claim, wherein the demodulated-combination-signal and the demodulated-suppression-signal comprise Viterbi bit metrics.

11. The receiver circuit of claim 1, wherein:
the combination-weights-calculator is configured to process subsets of frequency bins associated with the first-BF-input-signal and the second-BF-input-signal in order to determine the combination-weighting-values; and
the suppression-weights-calculator is configured to process subsets of frequency bins associated with the first-BF-input-signal and the second-BF-input-signal in order to determine the suppression-weighting-values.

12. The receiver circuit of claim 11, wherein:
the BFC-signal-generator is configured to apply the combination-weighting-values to the entire frequency bins associated with the first-BF-input-signal and the second-BF-input-signal in order to provide the BF-combination-signal; and
the BFS-signal-generator is configured to apply the suppression-weighting-values to the entire frequency bins associated with the first-BF-input-signal and the second-BF-input-signal in order to provide the BF-suppression-signal.

13. The receiver circuit of claim 1, wherein the first-BF-input-signal is received from a first antenna, and the second-BF-input-signal is received from a second antenna.

14. The receiver circuit of claim 1, wherein the MRC-output-signal is representative of a combination of the first-BF-input-signal and the second-BF-input-signal.

15. A method of operating a receiver circuit, the method comprising,
receiving a first-beamformer (BF)-input-signal and a second-BF-input-signal;
processing the first-BF-input-signal and the second-BF-input-signal in order to determine combination-weighting-values;
processing the first-BF-input-signal and the second-BF-input-signal in order to determine suppression-weighting-values;
applying the combination-weighting-values to the first-BF-input-signal and the second-BF-input-signal in order to provide a BF-combination-signal;
applying the suppression-weighting-values to the first-BF-input-signal and the second-BF-input-signal in order to provide a BF-suppression-signal;
demodulating the BF-combination-signal in order to provide a demodulated-combination-signal that comprises bit metrics;
demodulating the BF-suppression-signal in order to provide a demodulated-suppression-signal that comprises bit metrics; and
combining the demodulated-combination-signal with the demodulated-suppression-signal in order to provide an Maximal Ratio Combining (MRC)-output-signal.

* * * * *